US006738709B2

(12) United States Patent
Saito et al.

(10) Patent No.: US 6,738,709 B2
(45) Date of Patent: May 18, 2004

(54) FAILURE DIAGNOSTIC SYSTEM OF EVAPORATED FUEL PROCESSING SYSTEM

(75) Inventors: Kenji Saito, Okazaki (JP); Satoshi Nagashima, Okazaki (JP); Yoichiro Ando, Seto (JP); Hidetsugu Kanao, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 10/153,637

(22) Filed: May 24, 2002

(65) Prior Publication Data

US 2002/0193936 A1 Dec. 19, 2002

(30) Foreign Application Priority Data

May 25, 2001 (JP) .................................... 2001-156808

(51) Int. Cl.$^{7}$ ............................................ G06F 19/00
(52) U.S. Cl. ......................... 701/114; 73/49.7; 123/520
(58) Field of Search ................................ 701/114, 115; 123/520; 73/49.7

(56) References Cited

U.S. PATENT DOCUMENTS 5,758,628 A * 6/1998 Wada ......................... 123/520
5,816,222 A * 10/1998 Kidokoro .................... 123/520
6,223,732 B1 * 5/2001 Isobe et al. ................. 123/520
6,336,446 B1 * 1/2002 Isobe et al. ................. 123/520
6,338,336 B1 * 1/2002 Iida ............................ 123/674
6,367,459 B1 * 4/2002 Yoshioka et al. ........... 123/520
6,382,192 B2 * 5/2002 Kitajima et al. ............ 123/520
6,488,015 B2 * 12/2002 Isobe ......................... 123/520

FOREIGN PATENT DOCUMENTS

JP 6-159157 A 6/1994
JP 2000-161150 A 6/2000

* cited by examiner

*Primary Examiner*—John Kwon
(74) *Attorney, Agent, or Firm*—Birch, Stewart, Kolasch & Birch LLP

(57) ABSTRACT

A failure diagnostic system reduces the internal pressure of a fuel tank to a predetermined negative pressure, seals off the fuel tank from the air, and then determines whether an evaporated fuel processing system has failed or not by monitoring an increase in pressure in the fuel tank. In determination, the failure diagnostic system compares a detected pressure in the fuel tank with a reference value that is increased by a predetermined rate. The failure diagnostic system stops update of the detected pressure if the detected pressure becomes higher than the reference value, and resumes update of the detected pressure if the detected pressure becomes lower than the reference value. It is therefore possible to accurately determine whether the evaporated fuel processing system has failed or not even if the pressure in the fuel tank is rapidly increased.

10 Claims, 5 Drawing Sheets

FAILURE DIAGNOSTIC SYSTEM OF EVAPORATED FUEL PROCESSING SYSTEM

This non-provisional application claims priority under 35 U.S.C. §119(a) on Patent Application No. 2001-156808 filed in Japan on May 25, 2001, which is herein incorporated by reference.

BACKGROUND OF THE INVENTION

1. Field of the Invention

This invention relates to a failure diagnostic system that determines whether an evaporated fuel processing system for use in preventing evaporated fuel generated in a fuel tank from being emitted into the air has failed or not.

2. Description of Related Art

Japanese Laid-Open Patent Publication (Kokai) No. 2000-161150 discloses the method comprising the steps of reducing an internal pressure of a fuel tank to a predetermined negative pressure, then sealing off the fuel tank from external air, and monitoring the degree of increase in the internal pressure of the fuel tank to determine that an evaporated fuel processing system has failed if an increase equal to or greater than the predetermined value is detected. In the case where this method is adopted, if fuel is sloshing in the fuel tank, there is the possibility of a false diagnosis due to a great change in the tank internal pressure.

Japanese Laid-Open Patent Publication (Kokai) No. 6-159157 discloses the method comprising the steps of leading negative pressure into a fuel tank for a predetermined period of time and determining whether an evaporated fuel processing system has failed if the tank internal pressure does not become equal to or lower than a predetermined value. If a change ΔP in the tank internal pressure is equal to or greater than a predetermined value, it is determined that fuel is sloshing in the fuel tank and the diagnosis is stopped. If the tank internal pressure becomes lower than a pressure Ps detected prior to the determination that the fuel is sloshing, the diagnosis is resumed. Therefore, it may be considered that the above-mentioned problem may be solved by applying the method disclosed in the Japanese Laid-Open Patent Publication (Kokai) No. 6-159157 to the method disclosed in the Japanese Laid-Open Patent Publication (Kokai) No. 2000-161150.

In the method disclosed in the Japanese Laid-Open Patent Publication (Kokai) No. 2000-161150, however, a pressure restoration status after the pressure decrease is monitored. During the monitoring, the tank internal pressure is likely to gradually increase even when the evaporated fuel processing apparatus is normally operating. Therefore, if the method in which the diagnosis is not resumed until the detected pressure becomes equal to or lower than a pressure detected prior to the rapid increase in the pressure as disclosed in the Japanese Laid-Open Patent Publication (Kokai) No. 6-159157 is applied to the method disclosed in the Japanese Laid-Open Patent Publication (Kokai) No. 2000-161150, it is impossible to resume the diagnosis, and the diagnosis is stopped whenever a rapid increase in the pressure is detected. This considerably decreases failure diagnosis opportunities.

SUMMARY OF THE INVENTION

It is therefore an object of the present invention to provide a failure diagnostic system that is capable of correctly determining whether an evaporated fuel processing system has failed or not without considerably decreasing diagnosis opportunities even if the internal pressure of a fuel tank is rapidly increased due to sloshing of fuel or the like.

To attain the above object, the present invention provides a failure diagnostic system, which reduces a pressure in a fuel tank to a predetermined negative pressure, seals off the fuel tank from external air, and then determines whether an evaporated fuel processing system has failed or not according to the degree of increase in the pressure in the fuel tank, compares the pressure in the fuel tank with a reference value that is increased at a predetermined rate, and stops update of update pressure if the pressure has become higher than the reference value and resumes update of update pressure if the pressure has become equal to or lower than the reference value.

With this arrangement, if the detected pressure in the fuel tank has become greater than the reference value that is increased at a predetermined rate, the update of the detected pressure is stopped. This prevents false diagnosis in the case where the internal pressure of the fuel tank is rapidly increased to sloshing of the fuel or the like, thus enabling accurate diagnosis. After the rapid increase in the internal pressure of the fuel tank during a pressure restoring process after the pressure reduction, the detected pressure becomes equal to or lower than the reference value before it becomes equal to the pressure detected prior to the rapid increase, because the reference value is increased at the predetermined rate. If the detected pressure becomes equal to or lower than the reference value, the update of the detected pressure is resumed. This enables an improvement in diagnostic accuracy without considerably decreasing diagnosis opportunities.

It is preferred that while the pressure is higher than the reference value, the update pressure updating device regards an update pressure before the pressure becomes higher than the reference value as the update pressure.

This surely prevents false determination without considerably decreasing diagnosis opportunities.

Further, the detected pressure may be an output itself from a detecting device that detects the internal pressure of the fuel tank, but an output from the detecting device may be processed through a filter to be used as the detected pressure. In the case where the output processed through the filter is used as the detected pressure, detecting errors or small variations in outputs from the detecting device are averaged by the filter, and only great variations exceeding the permissible amount of the filter are compared with a reference value. This assures reliable diagnostic performance.

BRIEF DESCRIPTION OF DRAWINGS

The name of this invention, as well as other objects and advantages thereof, will be explained in the following with reference to the accompanying drawings, in which like reference characters designate the same or similar parts throughout the figures and wherein.

DETAILED DESCRIPTION OF THE PRESENT INVENTION

Figure 1:
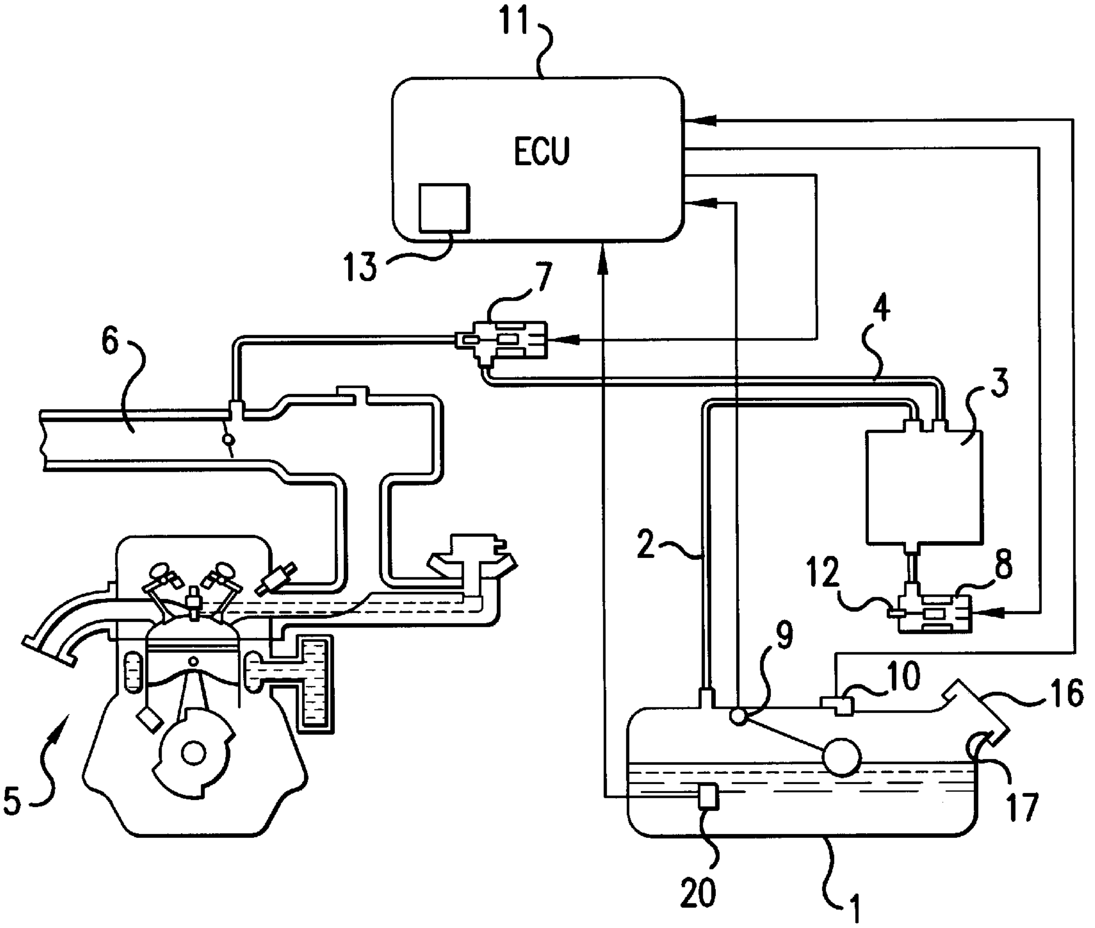
FIG. 1 is a schematic diagram showing the construction of an evaporated fuel processing system and a failure diagnostic system according to an embodiment of the present invention.

A preferred embodiment of the present invention will now be described with reference to the accompanying drawings. An evaporated fuel purge system as an evaporated fuel processing system according to the present embodiment is intended to prevent evaporated fuel (vapor) in a fuel tank 1 installed in a vehicle, such as a motor vehicle, from being emitted into the air. This system is constructed such that the evaporated fuel from the fuel tank 1 is led into a canister 3, which is connected to a vapor passage 2, through the vapor passage 2, and the evaporated fuel having been absorbed to the canister 3 is purged into an intake passage 6 of an internal combustion engine 5 through a purge passage 4 under predetermined conditions.

A purge solenoid valve 7 serving as an opening and closing device for opening and closing the purge passage 4 is provided in the purge passage 4. A vent solenoid valve 8 for opening and closing an air port 12 is mounted on the canister 3. The purge solenoid valve 7 and the vent solenoid valve 8 are used for failure diagnosis. The purge solenoid valve 7 and the vent solenoid valve 8 are connected to an engine control unit (hereinafter referred to as "ECU") 11 and are controlled to open and close according to control signals supplied from the ECU 11.

When turned on, the purge solenoid valve 7 is opened to open the purge passage 4, and when turned off, it closes the purge passage 4. The vent solenoid valve 8 opens the air port 12 when turned off, and closes the air port 12 when turned on. Normally, the purge solenoid valve 7 is ON and the vent solenoid valve 8 is OFF in the evaporated fuel purge system. If the determination conditions for failure diagnosis have been determined, the purge solenoid valve 7 is turned off to close the purge passage 4, and the vent solenoid valve 8 is turned on to close the air port 12 to increase the internal pressure of the fuel tank 1 to a pressure approximate to an atmospheric pressure. In this state, if the purge solenoid valve 7 is turned on to open the purge passage 4, the fuel tank 1 and the intake passage 6 are brought into communication with each other via the vapor passage 2 and the purge passage 4 so that the internal pressure of the fuel tank 1 can be reduced to a predetermined negative pressure P1 by the vacuuming action in the intake passage 6.

A fuel level sensor 9 as a remaining fuel quantity detecting device is attached to the fuel tank 1 so as to detect the quantity of remaining fuel in the fuel tank 1. A pressure sensor 10 as a pressure detecting device is attached to the fuel tank 1 so as to detect an internal pressure Pn of the fuel tank 1. A fuel temperature sensor 20 as a fuel temperature detecting device is attached to the fuel tank 1 so as to detect the temperature of the fuel in the fuel tank 1. Detection information supplied from the fuel level sensor 9, the pressure sensor 10, and the fuel temperature sensor 20 is transmitted to the ECU 11. A detachable filler cap 16 is mounted on an oil filler 17 of the fuel tank 1. In the state in which the filler cap 16 is normally mounted on the oil filler 17, the filler cap 16 seals the oil filler 17 to prevent the air from being led into the fuel tank 1 through the oil filler 17 (first embodiment).

Figure 2:
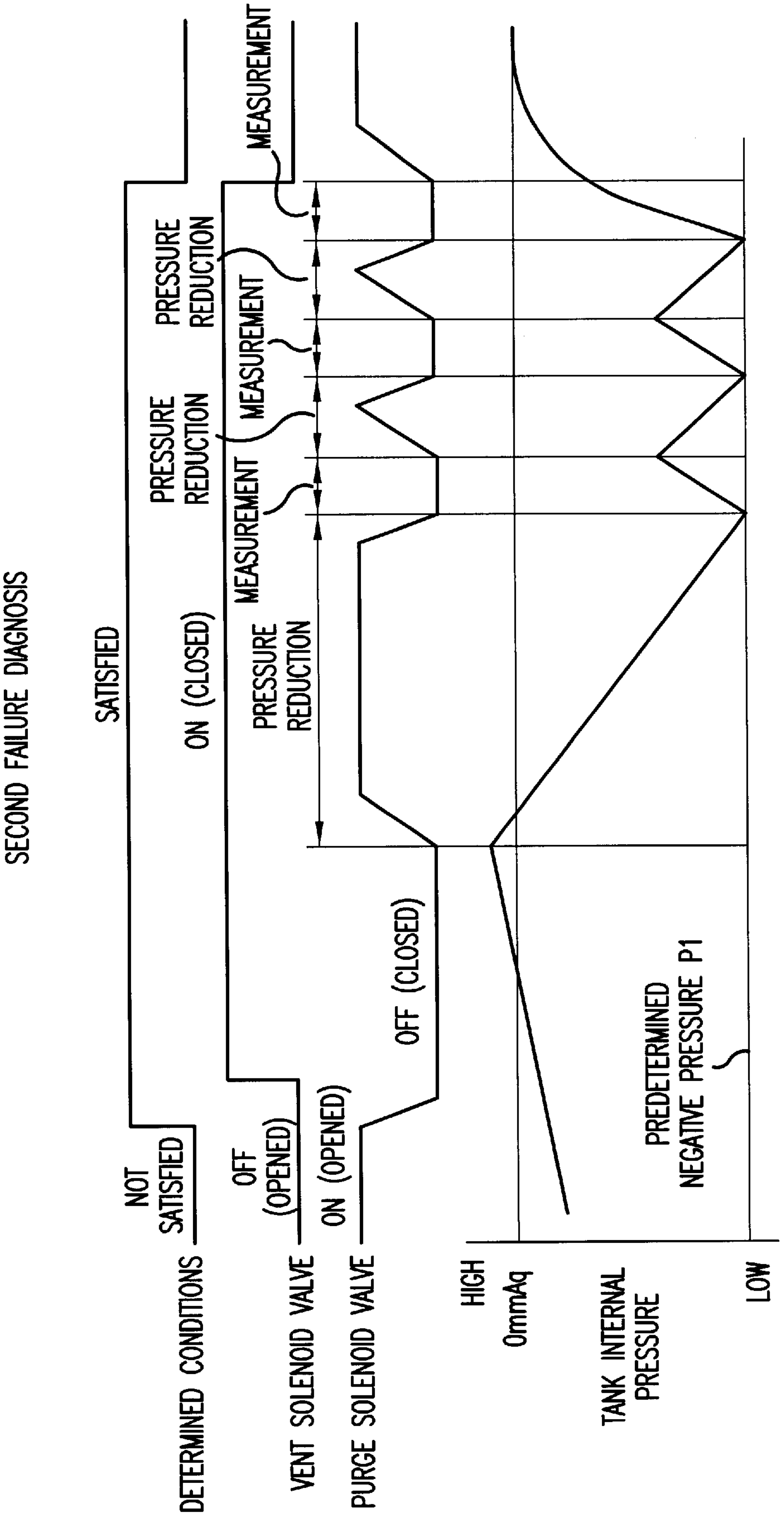
FIG. 2 is a timing chart showing a failure diagnosis carried out by the failure diagnostic system.

The evaporated fuel purge system constructed in the above-mentioned manner includes a failure diagnostic system that detects a failure caused by leakage in the evaporated fuel purge system in order to prevent evaporated fuel from being emitted into the air due to the failure of the evaporated fuel purge system. As shown in FIG. 2, by controlling the purge solenoid valve 7 and the vent solenoid valve 8, the failure diagnostic system reduces the internal pressure of the fuel tank 1 to the predetermined negative pressure P1, seals off the fuel tank 1 from the air, and then carries out failure diagnosis by monitoring the degree of increase ($\Delta P$) in the internal pressure of the fuel tank 1.

The failure diagnostic system includes a failure diagnostic device 13 that controls the purge solenoid valve 7 and the vent solenoid valve 8 to reduce the internal pressure of the fuel tank 1 to the predetermined negative pressure P1 and shut off the fuel tank 1 from external air, monitors the degree of increase $\Delta P$ (increase from the predetermined negative pressure P1) in the internal pressure of the fuel tank 1, and compares the detected pressure Pn in the fuel tank 1 with a reference value M that is increased at a predetermined rate. The failure diagnostic device 13 stops or resumes update of the detected pressure according to the result of the comparison to carry out the failure diagnosis. Although in the present embodiment, the ECU 11 includes the failure diagnostic system 13, the failure diagnostic system may be provided separately from the ECU 11.

Figure 3:
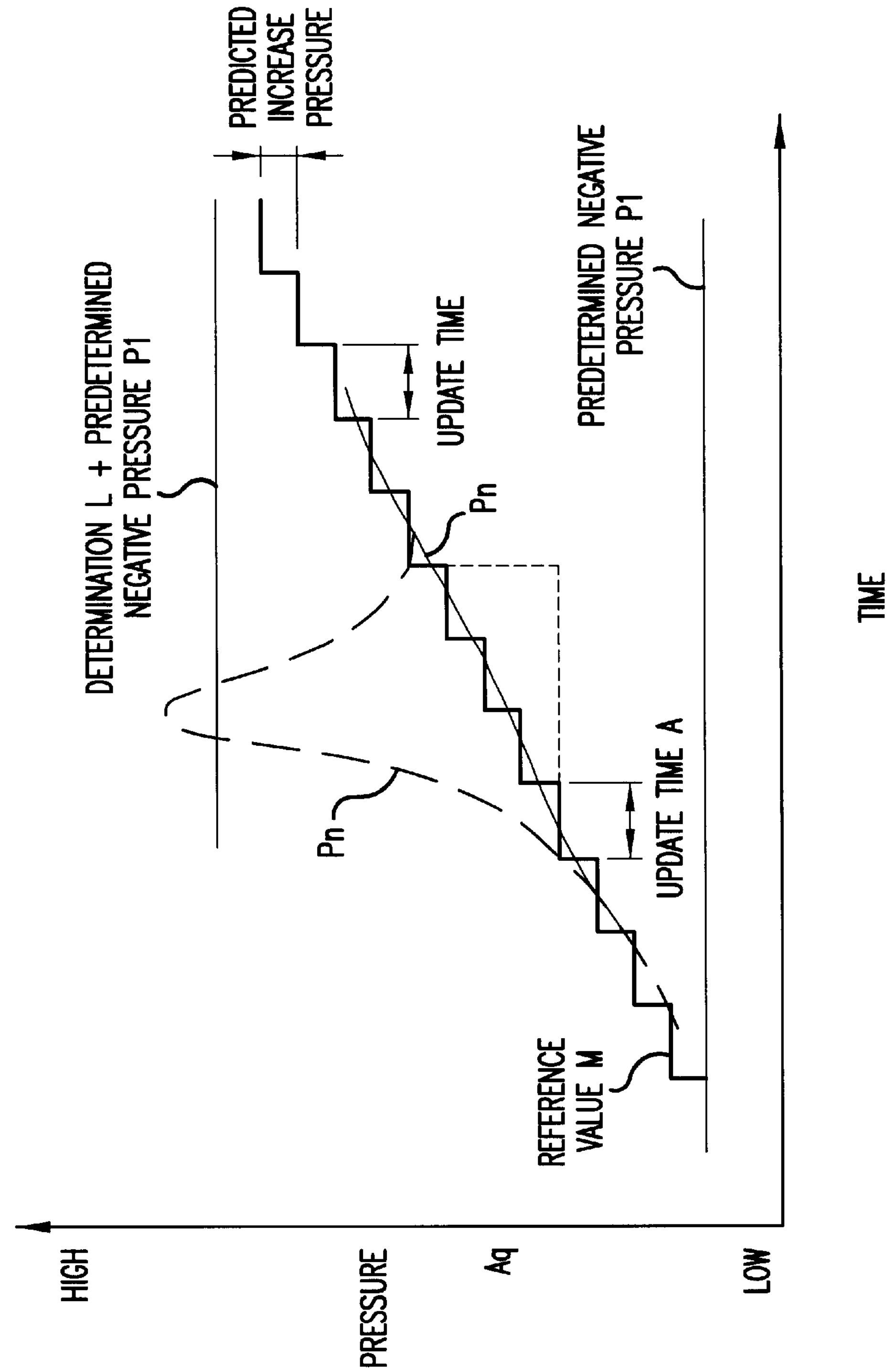
FIG. 3 is a diagram showing the relationship between a detected pressure in a tank and a reference value.

The ECU 11, shown in FIG. 2, is a known microcomputer that stores in advance mapping data on the reference value M to be used by the failure diagnostic device 13 and a determination value L in a memory, not shown. The reference value M represents a pressure in the fuel tank 1, which is predicted to increase at a predetermined rate per unit time (in an update time). In FIG. 3, the vertical axis represents pressure, and the horizontal axis represents time.

A description will now be given of the operation of the failure diagnostic device 13 with reference to a flow chart of FIG. 4.

Figure 4:
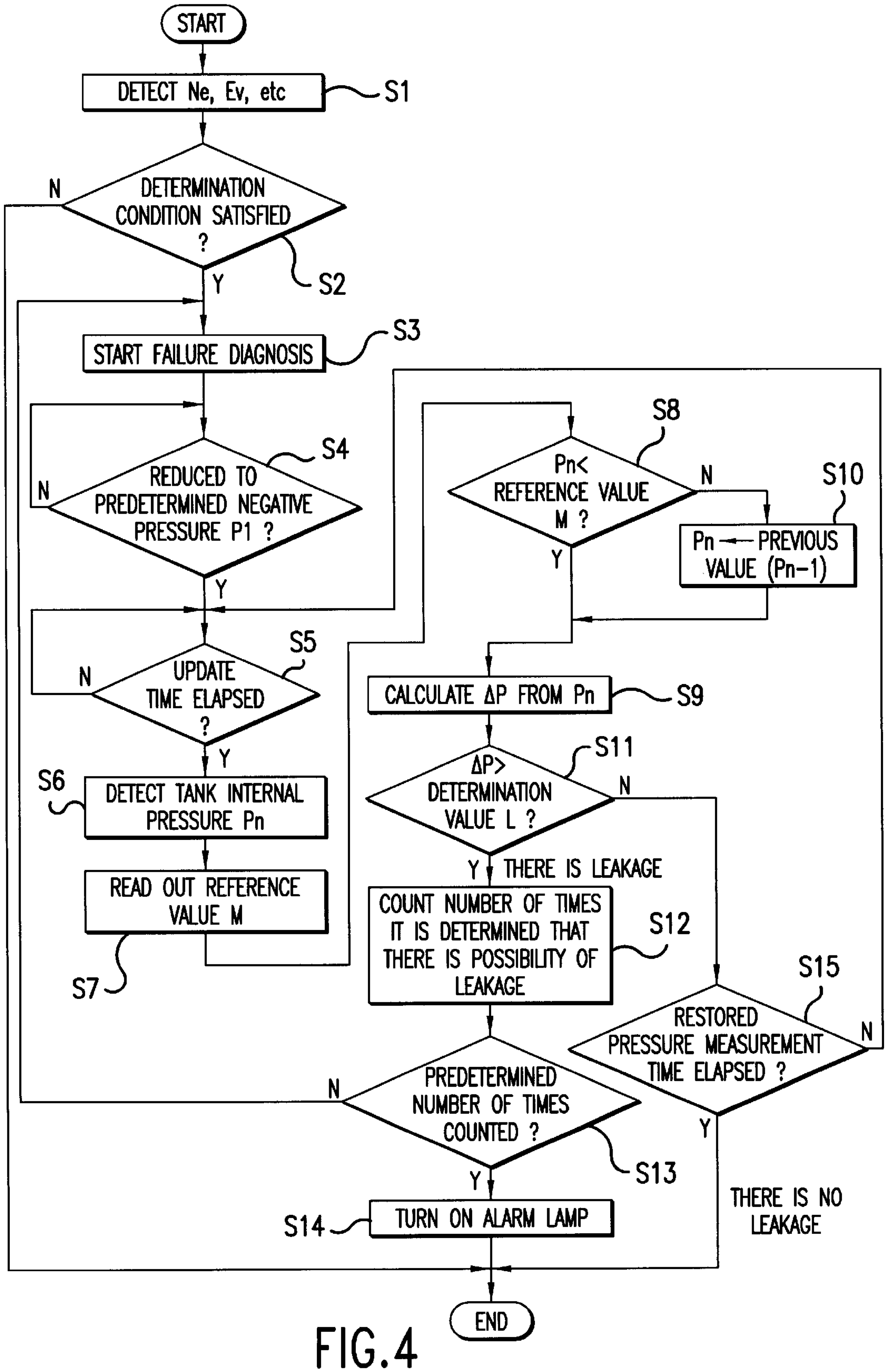
FIG. 4 is a flow chart showing one form of a failure diagnosis.

In FIG. 4, detecting devices, such as a revolutionary speed sensor and a throttle angle sensor, detect and read the engine speed Ne and the engine load Ev in step S1, and also read operating conditions such as the water temperature, intake temperature, learned air-fuel ratio, and remaining fuel quantity. It is determined in step S2 whether the determination conditions are satisfied or not according to the detection values read in step S1. If it is determined in step S2 that the determination conditions are satisfied, the process proceeds to step S3 to start the failure diagnosis, and if it is determined in step S2 that the determination conditions are not satisfied, the process is terminated without carrying out the failure diagnosis.

Upon start of the failure diagnosis, the purge solenoid valve 7 is turned on to reduce the internal pressure of the fuel tank 1. The internal pressure of the fuel tank 1 is reduced to the predetermined negative pressure P1 in step S4, and if the internal pressure has reached the predetermined negative pressure P1, the process proceeds to step S5. It is determined in step S5 whether an update time measured by a timer, not shown, has elapsed or not. In the case where the update time is 0.5 second, the process proceeds to step S6 upon elapse of 0.5 second. It should be understood, however, that the update time should not be restricted to this, but it may be determined according to the vacuuming ability of the engine 1, the control cycle, and the like. In step S6, the internal pressure (detected pressure) Pn of the fuel tank 1 is detected, and the process then proceeds to step S7 wherein the reference value M is read out from a map shown in FIG. 3. The process then proceeds to step S8.

In step S8, the detected pressure Pn is compared with the reference value M. If the detected pressure Pn is smaller than the reference value M, the process proceeds to step S9 wherein the degree of increase $\Delta P$ in the internal pressure of the fuel tank 1, i.e. Pn−P1 is calculated based on the detected pressure (updated pressure) Pn. If it is determined in step S8 that the detected pressure Pn is equal to or greater than the reference value M, the process proceeds to step S10 based on the determination that sloshing of the fuel caused an excessive change in the pressure. In step S10, the updated pressure Pn is not updated but replaced by the previous detected pressure Pn−1, which is detected prior to the determination in step S8. The process then proceeds to step S9 to calculate the degree of increase ΔP in the pressure.

More specifically, if the detected pressure Pn is smaller than the reference value M as indicated by a solid line in FIG. 3, the detected pressure Pn is used as it is. For example, the detected pressure Pn is greater than the reference value M in an update time A as indicated by a broken line, the update pressure Pn−1 detected prior just before the update time A is used to calculate the degree of increase ΔP in the internal pressure of the fuel tank 1.

In step S11, the calculated degree of increase ΔP is compared with a determination value L. If the degree of increase ΔP becomes greater than the determination value L, it is determined that there is the possibility of leakage in the evaporated fuel purge system, and the process proceeds to step S12. In step S12, the number of times it is determined that there is the possibility of leakage in the evaporated fuel purge system is counted, and it is then determined in step S13 when the counted number of times has reached a predetermined number of times (e.g. twice) or not. If it is determined that the counted number of times has reached the predetermined number of times, an alarm lamp, not shown, is turned on in step S14 to warn of a failure. If it is determined in step S13 that the counted number of times has not reached the predetermined number of times, the process returns to step S3 to repeat the subsequent processing again.

On the other hand, if it is determined in step S11 that the degree of increase ΔP is equal to or smaller than the predetermined value L, the process proceeds to step S15 wherein it is determined whether a restored pressure measurement time has elapsed or not, i.e. whether a predetermined period of time has elapsed or not since the internal pressure of the fuel tank 1 is reduced to the predetermined negative pressure P1. If it is determined that the measurement time has elapsed, the process is terminated based on the determination that there is no possibility of leakage in a fuel system. On the other hand, if it is determined that the measurement time has not elapsed, the process returns to step S5 wherein upon elapse of the update time, the internal pressure Pn of the fuel tank 1 is detected again and the reference value M for the new update time is read. The operation from step S5 to the step S11 is carried out until the degree of increase ΔP becomes greater than the determination value L or until the restored pressure measurement time is elapsed.

As described above, if the detected pressure Pn in the fuel tank 1 has become equal to or greater than the reference value M, the update of the detected pressure Pn is stopped to carry out the failure diagnosis according to the degree of increase ΔP calculated based on the previous detected pressure Pn−1. This prevents false determination even if the internal pressure of the fuel tank 1 is rapidly increased due to sloshing of the fuel or the like, and thus enables correct determination. After the rapid increase in the internal pressure of the fuel tank 1 in the pressure restoring process after the pressure reduction, the detected pressure becomes lower than the reference value M before it is reduced to the pressure detected before the rapid increase, because the reference value M is increased at the predetermined rate at intervals of elapsed time. If the detected pressure Pn has become lower than the reference value M, the update of the detected pressure Pn is resumed. Therefore, the failure diagnosis can be carried out according to the latest degree of increase ΔP that is constantly calculated based on the latest detected pressure Pn. This improves the diagnostic accuracy while assuring diagnostic opportunities without considerably decreasing the diagnosis opportunities.

It should be noted that an output from the pressure sensor 10 is processed through a filter to be used as the detected pressure Pn. Therefore, small variations can be processed through the filter and great variations can be processed by comparison with the reference value M. This enables the failure diagnosis to be carried out according to the accurately calculated degree of increase ΔP in the pressure and assures reliable diagnostic performance.

Figure 5:
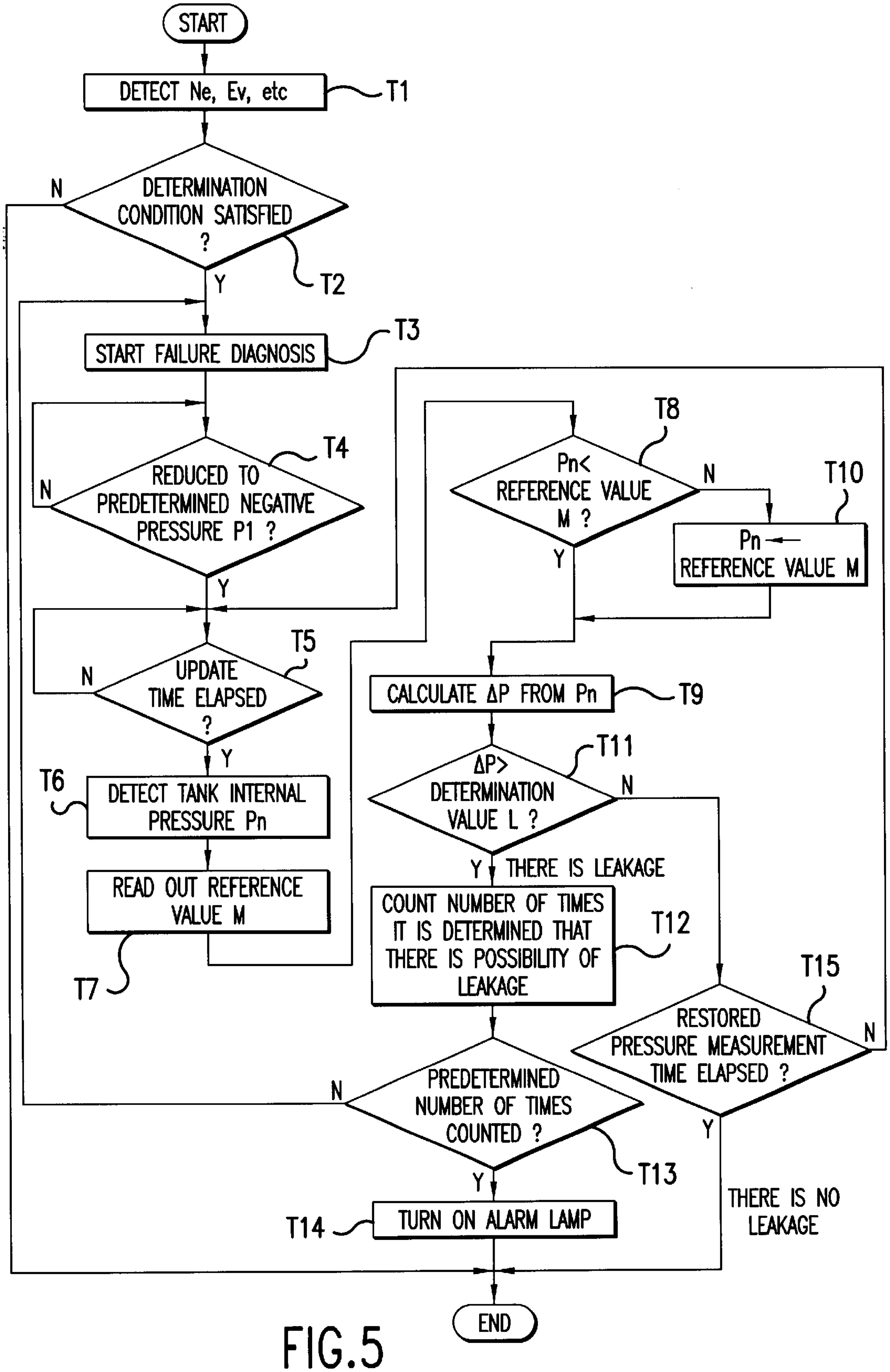
FIG. 5 is a flow chart showing another form of a failure diagnosis.

FIG. 5 shows another form of the failure diagnostic device 13. Steps T1 to T8 in a flow chart of FIG. 5 are identical with steps S1 to S8 in the flow chart of FIG. 4, and therefore, a detailed description thereof is omitted herein.

In step T8, a reference value M that is increased by a predetermined rate is compared with a detected pressure Pn. If the detected pressure Pn is smaller than the reference value M, the process proceeds to step T9 wherein the degree of pressure increase ΔP in the fuel tank 1 is calculated based on the detected pressure (update pressure). If the detected pressure Pn has become equal to or greater than the reference value M, the process proceeds to step T10 wherein the detected pressure Pn is canceled and replaced by the reference value M used in the comparison in step T8, which is regarded as the internal pressure of the fuel tank 1. The process proceeds to step T9 to calculate the degree of pressure increase ΔP.

In step T11, the calculated degree of pressure increase ΔP is compared with a determination value L. If the degree of pressure increase ΔP has become greater than the determination value L, it is determined that there is the possibility of leakage in the evaporated fuel purge system, and the process proceeds to step T12. In step T12, the number of times it is determined that there is the possibility of leakage in the evaporated fuel purge system is counted, and it is then determined in step T13 wherein it is determined whether the counted number of times has reached a predetermined number of times (e.g. twice) or not. If it is determined that the counted number of times has reached the predetermined number of times, an alarm lamp, not shown, is turned on in step T14 to warn of a failure. If it is determined in step T13 that the counted number of times has reached the predetermined number of times, the process returns to step S3 to repeat the subsequent processing.

On the other hand, if it is determined in step T11 that the degree of pressure increase ΔP is equal to or smaller than the predetermined value L, the process proceeds to step T15 wherein it is determined whether a restored pressure measurement time has elapsed or not, i.e. whether a predetermined period of time has elapsed or not since the internal pressure of the fuel tank 1 is decreased to the predetermined negative pressure P1. If it is determined in step T15 that the measurement time has elapsed, the process is terminated based on the determination that there is no possibility of leakage in a fuel system. On the other hand, if it is determined in step T15 that the measurement time has not elapsed, the process returns to step T5 wherein upon elapse of the update time, the internal pressure Pn of the fuel tank 1 is detected again and the reference value M for the new update time is read out. The process from steps T5 to the step T11 is carried out until the degree of pressure increase ΔP becomes greater than the determination value L or until the restored pressure measurement time is elapsed.

As described above, if the detected pressure Pn in the fuel tank 1 has become equal to or greater than the reference value M, the update of the detected pressure Pn is stopped to carry out the failure diagnosis according to the degree of pressure increase ΔP calculated based on the reference value M. This prevents false determination even if the internal pressure of the fuel tank 1 is rapidly increased due to sloshing of the fuel or the like, and thus enables correct determination. After the rapid increase in the internal pressure of the fuel tank 1 in the pressure restoring process after the pressure reduction, the detected pressure becomes lower than the reference value M before it is reduced to the pressure detected before the rapid increase, because the reference value M is increased at the predetermined rate at intervals of elapsed time. If the detected pressure Pn has become lower than the reference value M, the update of the detected pressure Pn is resumed. Therefore, the failure diagnosis can be carried out according to the latest degree of pressure increase ΔP that is always calculated based on the latest detected pressure Pn. This improves the diagnostic accuracy while assuring diagnostic opportunities without considerably decreasing the diagnosis opportunities.

Although in the above-described embodiments, the reference value M is read from the map shown in FIG. 3, this is not limitative, but for example, a value (Pn−1)+α found by adding a predetermined value α to the previously detected value (Pn−1) may be calculated as the reference value M at intervals of update time.

What is claimed is:

1. A failure diagnostic system for determining whether an evaporated fuel processing system has failed, comprising:

a pressure reduction device for reducing pressure inside the fuel tank until the pressure reaches a predetermined negative pressure and sealing off the fuel tank when the pressure reaches the predetermined negative pressure;

a pressure detecting device for continuously detecting an actual pressure in the fuel tank;

a reference value setting device for continuously setting a reference value increased at a predetermined rate;

a comparing device for comparing the detected actual pressure with the set reference value; and a degree of pressure calculating device for calculating the degree of pressure increase inside the fuel tank based on a value equal to or lower than the set reference value when the detected actual pressure is higher than the set reference value.

2. A failure diagnostic system according to claim 1, wherein:

while the detected actual pressure is higher than the set reference value, said degree of pressure calculating device calculates the degree of pressure increase based on a value of a previous actual pressure detected before the detected actual pressure became higher than the set reference value.

3. A failure diagnostic system according to claim 1, wherein:

while the pressure is higher than the set reference value, said degree of pressure calculating device calculates the degree of pressure increase based on the set reference value.

4. A failure diagnostic system according to claim 1, wherein:

while the detected actual pressure is lower than the set reference value, said degree of pressure calculating device calculates the degree of pressure increase based on the detected actual pressure.

5. A failure diagnostic system according to claim 1, further comprising:

an indicating device for indicating a failure of said evaporated fuel processing system when the calculated degree of pressure increase is greater than a determination value.

6. A method for detecting failure in an evaporated fuel processing system, comprising:

reducing pressure inside a fuel tank until a pressure inside the fuel tank reaches a predetermined negative pressure;

sealing off the fuel tank when the pressure reaches the predetermined negative pressure;

continuously detecting an actual pressure inside the fuel tank;

continuously setting a reference value that increases at a predetermined rate;

comparing the detected actual pressure with the set reference value; and calculating the degree of pressure increase inside the fuel tank based on a value equal to or lower than the set reference value when the detected actual pressure is higher than the set reference value.

7. The method of claim 6, wherein the calculating step includes, using the set reference value to calculate the degree of pressure increase when the detected actual pressure is higher than the set reference value.

8. The method of claim 6, wherein the calculating step includes, using a value of a previous actual pressure detected before the detected actual pressure became higher than the set reference value.

9. The method of claim 6, further comprising:

calculating the degree of pressure increase inside the fuel tank based on the detected actual pressure when the detected actual pressure is lower than the set reference value.

10. The method of claim 6, further comprising:

indicating a failure of the evaporated fuel processing system when the calculated degree of pressure increase is greater than a determination value.

* * * * *